(12) United States Patent
Abusleme et al.

(10) Patent No.: US 12,110,383 B2
(45) Date of Patent: Oct. 8, 2024

(54) CROSSLINKABLE BLENDS OF VDF COPOLYMERS

(71) Applicant: SOLVAY SPECIALTY POLYMERS ITALY S.P.A., Bollate (IT)

(72) Inventors: Julio A. Abusleme, Saronno (IT); Ségolène Brusseau, Tavaux (FR)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 794 days.

(21) Appl. No.: 17/264,956

(22) PCT Filed: Aug. 7, 2019

(86) PCT No.: PCT/EP2019/071221
§ 371 (c)(1),
(2) Date: Feb. 1, 2021

(87) PCT Pub. No.: WO2020/030694
PCT Pub. Date: Feb. 13, 2020

(65) Prior Publication Data
US 2022/0363885 A1    Nov. 17, 2022

(30) Foreign Application Priority Data
Aug. 9, 2018 (EP) .................................... 18306092

(51) Int. Cl.
*C08L 27/16* (2006.01)
*B29C 71/02* (2006.01)
*C08J 3/24* (2006.01)

(52) U.S. Cl.
CPC .............. *C08L 27/16* (2013.01); *B29C 71/02* (2013.01); *C08J 3/246* (2013.01); *C08J 2327/16* (2013.01); *C08J 2427/16* (2013.01); *C08L 2205/025* (2013.01); *C08L 2312/00* (2013.01)

(58) Field of Classification Search
CPC ........................... C08L 27/16; C08L 2205/025
See application file for complete search history.

(56) References Cited

U.S. PATENT DOCUMENTS

| | | | |
|---|---|---|---|
| 4,016,345 A | 4/1977 | Holmes | |
| 4,725,644 A | 2/1988 | Malhotra | |
| 5,003,008 A | 3/1991 | Kobayashi | |
| 5,880,204 A | 3/1999 | McCarthy et al. | |
| 6,479,591 B2 | 11/2002 | Kapeliouchko et al. | |
| 2006/0148912 A1 | 7/2006 | Katsurao et al. | |
| 2015/0030906 A1 | 1/2015 | Amin-Sanayei et al. | |
| 2017/0179456 A1* | 6/2017 | Kim | H01M 50/426 |

FOREIGN PATENT DOCUMENTS

| | | |
|---|---|---|
| EP | 0969023 A2 | 1/2000 |
| WO | 2008129041 A1 | 10/2008 |
| WO | 2013010936 A1 | 1/2013 |
| WO | 2018073277 A1 | 4/2018 |

OTHER PUBLICATIONS

Dongliang Wang, K. et al., "Porous PVDF asymmetric hollow fiber membranes preparedwith the use of small molecular additives", Journal of Membrane Science, 2000, 178, pp. 13-23.

* cited by examiner

*Primary Examiner* — John M Cooney
*Assistant Examiner* — Jeffrey S Lenihan
(74) *Attorney, Agent, or Firm* — Osha Bergman Watanabe & Burton LLP

(57) ABSTRACT

The present invention pertains to blends of crosslinkable vinylidene fluoride copolymers comprising recurring units derived from hydrophilic monomers, said blend being useful for producing shaped articles characterized by improved performances.

15 Claims, No Drawings

CROSSLINKABLE BLENDS OF VDF COPOLYMERS

CROSS-REFERENCE TO RELATED APPLICATIONS

This application is a U.S. national stage entry under 35 U.S.C. § 371 of International Application No. PCT/EP2019/071221 filed Aug. 7, 2019, which claims priority to European application No. 18306092.0, filed Aug. 9, 2018. The entire contents of these applications are explicitly incorporated herein by this reference.

TECHNICAL FIELD

The present invention pertains to blends of crosslinkable vinylidene fluoride copolymers comprising recurring units derived from hydrophilic monomers, said blend being useful for producing shaped articles characterized by improved performances.

BACKGROUND ART

Polyvinylidene fluoride polymers (PVDFs) are melt-processable resins that are formed into polymer structures by many different processes, such as extrusion, injection molding, fiber spinning, extrusion blow molding and blown film.

PVDFs are also used in form of solution, prepared by dissolving PVDF powder in organic solvents like acetone or NMP, for the production of articles such as films, coatings and fibers.

Increasing the PVDFs molecular weight is known to increase the performances of articles made from these materials, in particular in terms of mechanical properties.

However, high molecular weight PVDFs are difficult to be melt-processed.

High molecular weight PVDFs are also difficult to be properly dissolved in organic solvents. In particular, the higher the molecular weight, the longer it takes to prepare the solution.

It is thus difficult to impossible shaping said high molecular weight PVDFs by the processes known in the art.

The molecular weight of PVDF resins can be increased by crosslinking.

Approaches of crosslinking usually involve blending a cross-linker promoter with the fluoropolymer, followed by heat treatment or treatment with ionizing radiation to give crosslinking.

U.S. Pat. No. 5,003,008 (TDK CORP) 23 Mar. 1991 discloses a method for the preparation of a shaped article of a crosslinked polyvinylidene fluoride resin that comprises the steps of compounding a polyvinylidene fluoride resin with an organosilane, grafting said organosilane compound onto the molecules of the polyvinylidene fluoride resin, shaping the resin compound into a form of an article and heating the thus shaped article in the presence of water and a silanol-condensation catalyst in contact therewith.

In an alternative approach, fluorinated copolymers comprising pendant functional groups can be thermally cross-linked in the presence of a cross-linker promoter. As an example, EP0969023 (DUPONT THE NEMOURS AND COMPANY) 5 Jan. 2000, discloses functionalized fluoropolymers that may be thermally crosslinked in the presence of cross-linking promoters such as polyamides, wherein the functional groups of said fluoropolymers include esters, alcohols and acids.

US2006/0148912 (KUREHA CORPORATION) 1 Feb. 2006, discloses a vinylidene fluoride copolymer that incorporates in the backbone at least one species of hydrophilic group selected from epoxy group, hydroxyl group, carboxy group, ester group, amide group and acid anhydride group, which is admixed with a plasticizer and a good solvent to prepare a composition useful in the production of porous membranes. The film obtained by extrusion of said composition is then heat treated in order to increase its crystallinity, for the purpose of providing an improved processability of the porous membrane obtained therein. After the heat treatment, the film is subjected to an extraction process to remove the plasticizer and providing the porous membrane.

It is known in the art that copolymerizing vinylidene fluoride and hydrophilic monomers is indeed an uneasy task, due to the very different reactivity of such comonomers and their intrinsic incompatibility.

Moreover, incorporation of high amounts of functionalized monomers bearing hydrophilic groups into VDF backbones results in increased time for copolymerization, thus resulting in low productivity and the resultant copolymer may lose the intrinsic properties of the PVDFs resins.

In order to have an efficient degree of crosslinking that allows obtaining an enhanced molecular weight PVDFs and articles having improved performances, it would be desirable having a higher amount of functionalized groups inside VDF copolymers.

SUMMARY OF INVENTION

It has been found that blends of vinylidene fluoride copolymers each bearing certain functionalized monomers can be used for preparing shaped articles which can then be thermally treated to improve the performances of said shaped articles through crosslinking reaction between the functional groups present in the copolymers.

Furthermore, each vinylidene fluoride copolymer in the blend provides an amount of functional groups, which results in an overall higher quantity of groups that can undergo thermal crosslinking in comparison with copolymers known in the art.

It is thus an object of the invention a crosslinkable composition (C) comprising:
  A) at least one fluoropolymer [polymer (FA)] comprising:
   (i) recurring units derived from vinylidene fluoride (VDF) monomer;
   (ii) recurring units derived from at least one hydroxyl group-containing vinyl monomer (HA),
   wherein the total amount of monomer (HA) in said polymer (FA) is of at most 10.0% by moles, preferably at most 5.0% by moles, more preferably at most 1.5% by moles, with respect to the total moles of recurring units of polymer (FA);
   said polymer (FA) being characterized by a fraction of randomly distributed monomer (HA) of at least 40%; and
  B) at least one fluoropolymer [polymer (FB)], different from polymer (FA), comprising:
   (i) recurring units derived from vinylidene fluoride (VDF) monomer;
   (iii) recurring units derived from at least one carboxyl group-containing vinyl monomer (CA);
   wherein the total amount of monomer (CA) in said polymer (FB) is of at most 10.0% by moles, preferably at most 5.0% by moles, more preferably at most 1.5% by moles, with respect to the total moles of recurring units of polymer (FB);

said polymer (FB) being characterized by a fraction of randomly distributed monomer (CA) of at least 40%.

In a second object of the present invention it is provided a process for the preparation of the composition (C) as above detailed.

A third aspect of the present invention pertains to a process for preparing a crosslinked fluoropolymer (XLF) comprising the step of submitting the composition (C) to a heat treatment at a temperature comprised between 130° C. and 250° C.

The present invention further pertains to an article comprising the crosslinked fluoropolymer (XLF) obtained as above defined.

The present invention also pertains to a method for making an article comprising the crosslinked fluoropolymer (XLF), the method comprising:
(a) processing the composition (C) as above defined into a shaped article;
(b) thermally treating the shaped article provided in step (a) at a temperature comprised between 130° C. and 250° C.

DESCRIPTION OF EMBODIMENTS

By the term "recurring unit derived from vinylidene fluoride" (also generally indicated as vinylidene difluoride 1,1-difluoroethylene, VDF), it is intended to denote a recurring unit of formula $CF_2=CH_2$.

Suitable hydroxyl group-containing vinyl monomers (HA) are compounds of formula (I):

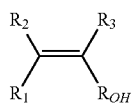

(I)

wherein:
$R_1$, $R_2$ and $R_3$, equal to or different from each other, are independently selected from a hydrogen atom, a halogen atom, and a $C_1$-$C_3$ hydrocarbon group and $R_{OH}$ is a $C_2$-$C_{10}$ hydrocarbon chain moiety comprising at least one hydroxyl group and possibly containing in the chain one or more oxygen atoms, carbonyl groups or carboxy groups.

In a preferred embodiment, monomers (HA) are compounds of formula (Ia):

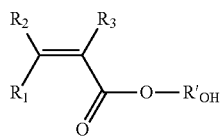

(Ia)

wherein:
$R_1$, $R_2$ and $R_3$, equal to or different from each other, are independently selected from a hydrogen atom and a $C_1$-$C_3$ hydrocarbon group and $R'_{OH}$ is a $C_1$-$C_5$ hydrocarbon moiety comprising at least one hydroxyl group.

Non-limitative examples of monomers (HA) of formula (Ia) include, notably:
hydroxyethyl(meth)acrylate (HEA),
2-hydroxypropyl acrylate (HPA),
hydroxyethylhexyl(meth)acrylate,
and mixtures thereof.

Preferably, the at least one monomer (HA) is hydroxyethyl(meth)acrylate (HEA).

Suitable carboxyl group-containing vinyl monomers (CA) are compounds of formula (II):

(II)

wherein:
$R_1$, $R_2$ and $R_3$, equal to or different from each other, are independently selected from a hydrogen atom and a $C_1$-$C_3$ hydrocarbon group and $R_H$ is a hydrogen or a $C_2$-$C_{10}$ hydrocarbon moiety comprising at least one carboxyl group.

In a preferred embodiment, monomers (CA) are compounds of formula (IIa):

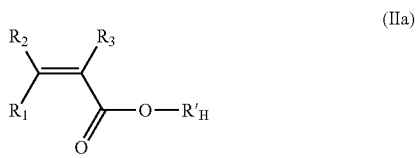

(IIa)

wherein
$R_1$, $R_2$ and $R_3$, equal to or different from each other, are independently selected from a hydrogen atom and a $C_1$-$C_3$ hydrocarbon group and $R'_H$ is a hydrogen or a $C_1$-$C_5$ hydrocarbon moiety comprising at least one carboxyl group.

Non-limitative examples of monomers (CA) of formula (IIa) include, notably:
acrylic acid (AA) and
(meth)acrylic acid,
and mixtures thereof.

Preferably, the at least one monomer (CA) is acrylic acid (AA).

The weight ratio between polymer (FA) and polymer (FB) in composition (C) can be comprised between 5:95 and 95:5, preferably comprised between 20:80 and 80:20.

The weight ratio between polymer (FA) and polymer (FB) in composition (C) is preferably such to allow obtaining a molar ratio between recurring units (ii) and recurring units (iii) in composition (C) comprised in the range from 20:1 to 1:20, preferably from 10:1 to 1:10.

It is essential that in polymer (FA) the fraction of randomly distributed units (HA) is of at least 40% and that in polymer (FB) the fraction of randomly distributed units (CA) is of at least 40%.

The expression "fraction of randomly distributed units (HA)" is intended to denote the percent ratio between the average number of (HA) monomer sequences (%), said sequences being comprised between two recurring units derived from VDF monomer in polymer (FA), and the total average number of (MA) monomer recurring units (%), according to the following formula:

$$\text{Fraction of randomly distributed units } (HA) = \\ \frac{\text{average number of } (HA) \text{ sequences } (\%)}{\text{average total number of } (HA) \text{ units } (\%)} \cdot 100$$

When each of the (HA) recurring units is isolated, that is to say comprised between two recurring units of VDF monomer, the average number of (HA) sequences equal the average total number of (HA) recurring units, so the fraction of randomly distributed units (HA) in polymer (FA) is 100%: this value corresponds to a perfectly random distribution of (HA) recurring units within polymer (FA).

Thus, the larger is the number of isolated (HA) units with respect to the total number of (HA) units, the higher will be the percentage value of fraction of randomly distributed units (HA), as above described.

The expression "fraction of randomly distributed units (CA)" is intended to denote the percent ratio between the average number of (CA) monomer sequences (%), said sequences being comprised between two recurring units derived from VDF monomer in polymer (FB), and the total average number of (CA) monomer recurring units (%), according to the following formula:

$$\text{Fraction of randomly distributed units } (CA) = \\ \frac{\text{average number of } (CA) \text{ sequences } (\%)}{\text{average total number of } (CA) \text{ units } (\%)} \cdot 100$$

When each of the (CA) recurring units is isolated, that is to say comprised between two recurring units of VDF monomer, the average number of (CA) sequences equal the average total number of (CA) recurring units, so the fraction of randomly distributed units (CA) in polymer (FB) is 100%: this value corresponds to a perfectly random distribution of (CA) recurring units within in polymer (FB).

Thus, the larger is the number of isolated (CA) units with respect to the total number of (CA) units, the higher will be the percentage value of fraction of randomly distributed units (CA), as above described.

Determination of total average number of (HA) monomer recurring units in polymer (FA) and of (CA) monomer recurring units in polymer (FB) can be performed by any suitable method, NMR being preferred.

The fraction of randomly distributed units (HA) and (CA) in polymer (FA) and in polymer (FB), respectively, is preferably of at least 50%, more preferably of at least 60%, most preferably of at least 70%.

Polymer (FA) comprises preferably at least 0.1%, more preferably at least 0.2% moles of recurring units derived from said monomer (HA).

Polymer (FA) comprises preferably at most 7.0%, more preferably at most 5.0% moles, even more preferably at most 3.0% moles of recurring units derived from monomer (HA).

Polymer (FB) comprises preferably at least 0.1%, more preferably at least 0.2% moles of recurring units derived from said monomer (CA).

Polymer (FB) comprises preferably at most 7.0%, more preferably at most 5.0% moles, even more preferably at most 3.0% moles of recurring units derived from monomer (CA).

Excellent results have been obtained in compositions (C) with polymer (FA) and polymer (FB) each comprising at least 70% by moles of recurring units derived from VDF.

Both polymers (FA) and (FB) can independently be elastomers or semi-crystalline polymers.

Preferably, both polymer (FA) and polymer (FB) are semi-crystalline polymers.

As used herein, the term "semi-crystalline" means a fluoropolymer that has, besides the glass transition temperature Tg, at least one crystalline melting point on DSC analysis. For the purposes of the present invention a semi-crystalline fluoropolymer is hereby intended to denote a fluoropolymer having a heat of fusion of from 10 to 90 J/g, preferably of from 30 to 80 J/g, more preferably of from 35 to 75 J/g, as measured according to ASTM D3418-08.

To the purpose of the invention, the term "elastomer" is intended to designate a true elastomer or a polymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Preferably, the intrinsic viscosity of polymer (F), measured in dimethylformamide at 25° C., is lower than 0.80 l/g, preferably lower than 0.50 l/g, more preferably lower than 0.20 l/g.

Both polymers (FA) and polymer (FB) may further comprise recurring units derived from one or more fluorinated comonomers (CF) different from VDF.

By the term "fluorinated comonomer (CF)", it is hereby intended to denote an ethylenically unsaturated comonomer comprising at least one fluorine atoms.

Non-limitative examples of suitable fluorinated comonomers (CF) include, notably, the followings:

(a) $C_2$-$C_8$ fluoro- and/or perfluoroolefins such as tetrafluoroethylene (TFE), hexafluoropropylene (HFP), pentafluoropropylene and hexafluoroisobutylene;

(b) $C_2$-$C_8$ hydrogenated monofluoroolefins, such as vinyl fluoride; 1,2-difluoroethylene and trifluoroethylene;

(c) perfluoroalkylethylenes of formula $CH_2$=$CH$—$R_{f0}$, wherein $R_{f0}$ is a $C_1$-$C_6$ perfluoroalkyl group;

(d) chloro- and/or bromo- and/or iodo-$C_2$-$C_6$ fluoroolefins such as chlorotrifluoroethylene (CTFE).

The fluorinated comonomer (CF) in polymer (FA) and in polymer (FB) is preferably HFP.

In one preferred embodiment, polymer (F) is semi-crystalline and comprises from 0.1 to 10.0% by moles, preferably from 0.3 to 5.0% by moles, more preferably from 0.5 to 3.0% by moles of recurring units derived from said fluorinated comonomer (CF).

In a preferred embodiment according to the present invention, both polymer (FA) and polymer (FB) include at least one fluorinated comonomer (CF), preferably HFP.

It is understood that chain ends, defects or other impurity-type moieties might be comprised in polymer (FA) or in polymer (FB) without these impairing their properties.

The polymer (FA) more preferably comprises recurring units derived from:
  at least 70% by moles, preferably at least 75% by moles, more preferably at least 85% by moles of vinylidene fluoride (VDF),
  from 0.1% to 3.0% by moles, preferably from 0.2% to 1.5% by moles, more preferably from 0.5% to 1.0% by moles of at least one hydroxyl group-containing vinyl monomer (HA);
  optionally from 0.5 to 3.0% by moles of recurring units derived from at least one fluorinated comonomer (CF).

The polymer (FB) more preferably comprises recurring units derived from:
- at least 70% by moles, preferably at least 75% by moles, more preferably at least 85% by moles of vinylidene fluoride (VDF),
- from 0.1% to 3.0% by moles, preferably from 0.2% to 1.5% by moles, more preferably from 0.5% to 1.0% by moles of at least one hydroxyl group-containing vinyl monomer (CA);
- optionally from 0.5 to 3.0% by moles of recurring units derived from at least one fluorinated comonomer (CF).

Polymer (FA) and polymer (FB) may be obtained by polymerization of a VDF monomer, optionally at least one comonomer (CF), and, respectively, at least one monomer (HA) and at least one monomer (CA) either in suspension in organic medium, according to the procedures described, for example, in WO 2008129041, or in aqueous emulsion, typically carried out as described in the art (see e.g. U.S. Pat. Nos. 4,016,345, 4,725,644 and 6,479,591).

The procedure for preparing polymer (FA) comprises polymerizing in an aqueous medium in the presence of a radical initiator the vinylidene fluoride (VDF) monomer, monomer (HA) and optionally comonomer (CF) in a reaction vessel, said process comprising:
- continuously feeding an aqueous solution comprising monomer (HA); and
- maintaining the pressure in said reactor vessel exceeding the critical pressure of the vinylidene fluoride.

The procedure for preparing polymer (FB) comprises polymerizing in an aqueous medium in the presence of a radical initiator the vinylidene fluoride (VDF) monomer, monomer (CA) and optionally comonomer (CF) in a reaction vessel, said process comprising:
- continuously feeding an aqueous solution comprising monomer (CA); and
- maintaining the pressure in said reactor vessel exceeding the critical pressure of the vinylidene fluoride.

During the whole polymerization run, pressure is maintained above critical pressure of vinylidene fluoride. Generally the pressure is maintained at a value of more than 50 bars, preferably of more than 75 bars, even more preferably of more than 100 bars.

It is essential that a continuous feeding of an aqueous solution containing either monomer (HA) or monomer (CA) is continued during the whole duration of polymerization run for preparing polymer (FA) or polymer (FB), respectively.

In this way, it is possible to obtain a nearly statistic distribution of the monomer (HA) in polymer (FA) and of monomer (CA) in polymer (FB) within the VDF monomer polymer backbone of polymer.

The expressions "continuous feeding" or "continuously feeding" means that slow, small, incremental additions of the aqueous solution of monomer (HA) or of the aqueous solution of monomer (CA) take place until polymerization has concluded.

The aqueous solutions of monomer (HA) or of monomer (CA) continuously fed during polymerization amounts for at least 50% wt of the total amount of said monomers supplied during the reaction (i.e. initial charge plus continuous feed) for the preparation of polymer (FA) or polymer (FB), respectively. Preferably at least 60% wt, more preferably at least 70% wt, most preferably at least 80% wt of the total amount of either monomer (HA) or monomer (CA) is continuously fed during polymerization. An incremental addition of VDF monomer can be effected during polymerization, even if this requirement is not mandatory. Generally, the process for preparing polymer (FA) and polymer (FB) of the invention is carried out at a temperature of at least 35° C., preferably of at least 40° C., more preferably of at least 45° C.

When the polymerization to obtain either polymer (FA) or polymer (FB) is carried out in suspension, polymers (FA) and polymers (FB) are typically provided in form of powder.

When the polymerization to obtain either polymer (FA) or polymer (FB) is carried out in emulsion, polymer (FA) and polymer (FB), typically provided in the form of an aqueous dispersion, aqueous dispersion (DA) and aqueous dispersion (DB), respectively, which may be used as directly obtained by the emulsion polymerization or after a concentration step. Preferably, the solid content of polymer (FA) and of polymer (FB) in dispersion (DA) and in dispersion (DB), respectively, is in the range comprised between 20 and 50% by weight.

Polymer (FA) and polymer (FB) obtained by emulsion polymerization can be isolated from the aqueous dispersion (DA) and dispersion (DB), respectively, by concentration and/or coagulation of the dispersion and obtained in powder form by subsequent drying.

Polymer (FA) and polymer (FB) may be optionally further extruded to provide polymer (FA) and polymer (FB) in the form of pellets.

Extrusion is suitably carried out in an extruder. Duration of extrusion suitably ranges from few seconds to 3 minutes.

Polymer (FA) and polymer (FB) may be dissolved in any suitable organic solvent to provide corresponding solution (SA) and solution (SB), respectively.

Preferably, the solid content of polymer (FA) in solution (SA) and of polymer (FB) in solution (SB) is in the range comprised between 2 and 30% by weight.

Non-limitative examples of suitable organic solvents for dissolving polymer (FA) and polymer (FB) are N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, and trimethyl phosphate, aliphatic ketones, cycloaliphatic ketones, cycloaliphatic esters. These organic solvents may be used singly or in mixture of two or more species.

In another aspect, the present invention provides a process for the preparation of the composition (C) as above detailed, said process comprising the step of mixing with any conventional mixing technique the at least one polymer (FA) with the at least one polymer (FB).

In one embodiment of the present invention, composition (C) is prepared by mixing polymer (FA) and polymer (FB), both in solid form, in a suitable mixer.

Composition (C) may thus be provided in the solid form and optionally further extruded to provide composition (C) in the form of pellets.

Composition (C) obtained as above defined may also be dissolved in a suitable organic solvent as defined above for dissolving polymer (FA) and polymer (FB) and provided in the form of solution [solution (CS)].

In another embodiment of the present invention, composition (C) is prepared by mixing polymer (FA) and polymer (FB) both in the form of solutions in suitable organic solvents, thus by mixing solution (SA) with solution (SB) as above defined, leading to composition (CS) as above defined.

In another embodiment of the present invention, composition (C) is prepared by mixing polymer (FA) and polymer (FB) both in the form of aqueous dispersions, thus by mixing dispersion (DA) with dispersion (DB) as above defined, thus leading to composition (DS) in the form of aqueous dispersion.

Composition (CS) and composition (CD) can be submitted to a heat treatment for the removal of the organic solvent or of water, respectively, to give again composition (C) in solid form, thus free from any organic solvent or water.

In another aspect of the invention, composition (C) may further include at least one acidic crosslinking catalyst.

Suitable acidic crosslinking catalysts include, for example, Lewis acids, strong mineral acids, e.g., sulfuric acid, phosphoric acid, polyphosphoric acid, perchloric acid, and the like; saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted benzenesulfonic acid, and the like.

Suitable Lewis acids here are inorganic or organic metal compounds in which the cation is preferably selected from the group consisting of boron, aluminium, tin, antimony and iron.

Of the Lewis acids mentioned, particular preference is given, in particular, to metal halide Lewis acids, e.g., boron trifluoride, aluminum chloride, zinc chloride, stannous chloride, antimony trichloride, ferric chloride, boron trifluoridedimethyl ether complex, boron trifluoride-diethyl ether complex, boron trifluoride-dipropyl ether complex, and the like, with stannous chloride being particularly preferred.

The Lewis acids include not only Lewis acids themselves but also metals or metal compounds which impart a function of Lewis acid, for example oxides and sulfides, antimony trioxide ($Sb_2O_3$), zinc oxide (ZnO) and zinc sulphide (ZnS) being preferred.

In composition (C), the acidic crosslinking catalyst is preferably comprised in an amount comprised between 0.001 and 2.0% by weight, more preferably comprised between 0.005 and 0.5% by weight with respect to the total weight of polymers (FA) and (FB).

The acidic crosslinking catalyst may be conveniently added to composition (C) prepared as above detailed.

In an alternative embodiment, the acidic crosslinking catalyst may be added to polymer (FA), to polymer (FB) or both to polymer (FA) and polymer (FB) before using the same for preparing the composition (C).

When added to either polymer (FA) or polymer (FB), the acidic crosslinking catalyst is preferably comprised in an amount comprised between 0.001 and 2.0% by weight, more preferably comprised between 0.005 and 0.5% by weight with respect to the weight of either polymer (FA) or polymer (FB).

When added to both polymer (FA) and polymer (FB), the acidic crosslinking catalyst is preferably comprised in an amount comprised between 0.001 and 2.0% by weight, more preferably comprised between 0.005 and 0.5% by weight with respect to the total weight of polymer (FA) and polymer (FB).

The acidic crosslinking catalyst is preferably added to polymer (FB) only.

In an embodiment of the present invention, composition (C) comprises, preferably consists of:
A) at least one polymer (FA) comprising recurring units derived from:
   at least 70% by moles, preferably at least 75% by moles, more preferably at least 85% by moles of vinylidene fluoride (VDF),
   from 0.1% to 3.0% by moles, preferably from 0.2% to 1.5% by moles, more preferably from 0.5% to 1.0% by moles of at least one hydroxyl group-containing vinyl monomer (HA);
   optionally from 0.5 to 3.0% by moles of recurring units derived from at least one fluorinated comonomer (CF);
B) at least one polymer (FB) comprising recurring units derived from:
   at least 70% by moles, preferably at least 75% by moles, more preferably at least 85% by moles of vinylidene fluoride (VDF),
   from 0.1% to 3.0% by moles, preferably from 0.2% to 1.5% by moles, more preferably from 0.5% to 1.0% by moles of at least one carboxyl group-containing vinyl monomer (CA);
   optionally from 0.5 to 3.0% by moles of recurring units derived from at least one fluorinated comonomer (CF);
C) an acidic crosslinking catalyst in an amount comprised between 0.001 and 2.0% by weight, more preferably comprised between 0.005 and 0.5% by weight with respect to the total weight of polymers (FA) and (FB).

In an embodiment of the present invention, composition (CS) comprises, preferably consists of:
A) at least one polymer (FA) comprising recurring units derived from:
   at least 70% by moles, preferably at least 75% by moles, more preferably at least 85% by moles of vinylidene fluoride (VDF),
   from 0.1% to 3.0% by moles, preferably from 0.2% to 1.5% by moles, more preferably from 0.5% to 1.0% by moles of at least one hydroxyl group-containing vinyl monomer (HA);
   optionally from 0.5 to 3.0% by moles of recurring units derived from at least one fluorinated comonomer (CF);
B) at least one polymer (FB) comprising recurring units derived from:
   at least 70% by moles, preferably at least 75% by moles, more preferably at least 85% by moles of vinylidene fluoride (VDF),
   from 0.1% to 3.0% by moles, preferably from 0.2% to 1.5% by moles, more preferably from 0.5% to 1.0% by moles of at least one carboxyl group-containing vinyl monomer (CA);
   optionally from 0.5 to 3.0% by moles of recurring units derived from at least one fluorinated comonomer (CF);
C) an acidic crosslinking catalyst in an amount comprised between 0.001 and 2.0% by weight, more preferably comprised between 0.005 and 0.5% by weight with respect to the total weight of polymers (FA) and (FB); and
D) at least one organic solvent.

In an embodiment of the present invention, composition (CS) comprises, preferably consists of:
A) at least one polymer (FA) comprising recurring units derived from:
   at least 70% by moles, preferably at least 75% by moles, more preferably at least 85% by moles of vinylidene fluoride (VDF),
   from 0.1% to 3.0% by moles, preferably from 0.2% to 1.5% by moles, more preferably from 0.5% to 1.0% by moles of at least one hydroxyl group-containing vinyl monomer (HA);

optionally from 0.5 to 3.0% by moles of recurring units derived from at least one fluorinated comonomer (CF);

B) at least one polymer (FB) comprising recurring units derived from:
- at least 70% by moles, preferably at least 75% by moles, more preferably at least 85% by moles of vinylidene fluoride (VDF),
- from 0.1% to 3.0% by moles, preferably from 0.2% to 1.5% by moles, more preferably from 0.5% to 1.0% by moles of at least one carboxyl group-containing vinyl monomer (CA);
- optionally from 0.5 to 3.0% by moles of recurring units derived from at least one fluorinated comonomer (CF);

C) an acidic crosslinking catalyst in an amount comprised between 0.001 and 2.0% by weight, more preferably comprised between 0.005 and 0.5% by weight with respect to the total weight of polymers (FA) and (FB); and D) water.

Composition (C) can be shaped into an article before exposure to thermal treatment and crosslinking.

Since the crosslinking occurs thermally, the crosslinking process can be coordinated with the manufacturing of composition (C) into a shaped article.

Composition (CS), and composition (DS) can be shaped into an article, then submitted to a heat treatment for the removal of the at least one organic solvent or of water to give again composition (C) free from said organic solvent or water.

The composition (C) of the present invention may be thermally treated at a temperature comprised between 130° C. and 250° C. to achieve a crosslinked fluoropolymer (XLF) characterized by an improved molecular weight.

As used herein, "thermal treatment", "thermally crosslinked" and "occurs thermally" are understood to mean that the cross-linking process of the invention is activated by temperature. One skilled in the art will recognize that the time required to achieve cross-linking will in general depend on the temperature, with cross-linking occurring more rapidly as temperature increases. The time of the heat treatment may thus vary from 5 minutes up to 30 days, depending on the temperature and on the nature of polymer (FA) and polymer (FB).

Composition (C) of the invention can be suitably converted into shaped articles and then submitted to thermal crosslinking to improve the performances of said articles.

Thermal crosslinking involves reaction of at least a portion of the hydroxyl groups of recurring units derived from monomer (HA) in polymer (FA) with at least a portion of the carboxyl groups of recurring units derived from monomer (CA) in polymer (FB).

The thermal treatment can be carried out in air or under inert gas atmosphere.

In one aspect, the present invention provides a method for making an article comprising the crosslinked fluoropolymer (XLF), the method comprising:
a) melt processing the composition (C) as above defined through techniques such as extrusion, injection molding, compression molding, transfer molding, and the like into a shaped article;
b) thermally treating the shaped article obtained in step a) at a temperature comprised between 130° C. and 250° C.

In a preferred embodiment of the invention, when melt processing is involved the intrinsic viscosity of polymers (FA) and (FB), measured in dimethylformamide at 25° C., is comprised between 0.05 l/g and 0.15 l/g.

In another aspect, the present invention provides a method for making an article comprising the crosslinked fluoropolymer (XLF), the method comprising:
a) processing a solution composition (CS) in an organic solvent as above defined through techniques such as casting the solutions in open molds, on horizontal surfaces or pads, to into a shaped article;
b) removing the organic solvent to give a shaped article of composition (C);
c) thermally treating the shaped article obtained in step b) at a temperature comprised between 130° C. and 250° C.

In a preferred embodiment of the invention, when solution process is involved, the intrinsic viscosity of polymers (FA) and (FB), measured in dimethylformamide at 25° C., is comprised between 0.15 l/g and 0.35 l/g In another aspect, the present invention provides a method for making an article comprising the crosslinked fluoropolymer (XLF), the method comprising:
a) processing a composition (CD) in form of dispersion in water as above defined through techniques such as into a shaped article;
b) removing the organic solvent to give a shaped article of composition (C);
c) thermally treating the shaped article obtained in step b) at a temperature comprised between 130° C. and 250° C.

The present invention further pertains to an article comprising the crosslinked fluoropolymer (XLF) obtained as above defined.

The main targeted uses of the crosslinkable fluoropolymers (F) of the invention, and of compositions (C) comprising said polymers (F), are for the manufacture of articles that can be shaped and later undergo crosslinking by thermal treatments, while maintaining the well known and proved characteristics of PVDF in terms of chemical resistance, surface properties, high service temperatures.

For example, polymers (F) or compositions (C) in solid form are particularly suitable for the preparation of pipes, sheets, fittings and coatings in Chemical Processing Industry and in Oil and Gas Industry.

Polymers (F) or compositions (C) in solution are particularly suitable for the preparation of film and membranes, porous membranes in particular such as for example as described in Journal of Membrane Science 178 (2000) 13-23.

Polymers (F) or compositions (C) in dispersion are particularly suitable for the preparation of components for batteries, such as binders for electrodes and layers to be used as separator coating, such as for example for applications described in US201503906 (ARKEMA Inc.), 19 Aug. 2014.

Should the disclosure of any patents, patent applications, and publications which are incorporated herein by reference conflict with the description of the present application to the extent that it may render a term unclear, the present description shall take precedence.

EXPERIMENTAL PART

Determination of Intrinsic Viscosity of Polymer (FA) and Polymer (FB)

Intrinsic viscosity ($\eta$) [dl/g] was measured using the following equation on the basis of dropping time, at 25° C., of a solution obtained by dissolving either polymer (FA) or polymer (FA) in N,N-dimethylformamide at a concentration of about 0.2 g/dl using a Ubbelhode viscosimeter:

$$[\eta] = \frac{\eta_{sp} + \Gamma \cdot \ln\eta_r}{(1+\Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r-1$, and $\Gamma$ is an experimental factor, which for polymers (FA) and (FB) corresponds to 3.

Determination of Randomly Distributed (HA) Units Fraction in Polymer (FA) and of Randomly Distributed (CA) Units Fraction in Polymer (FB)

Fraction of randomly distributed (HA) and (CA) units in polymer (FA) and polymer (FB), respectively, is determined by $^{19}$F-NMR, following the procedures disclosed in WO 2013/010936.

Example 1: Preparation of Terpolymer VDF-HFP-HEA (Polymer (FA))

In a 80 liters reactor equipped with an impeller running at a speed of 250 rpm were introduced in sequence 58242 g of demineralised water and 11.1 g of METHOCEL® K100 GR suspending agent. The reactor was purged with sequence of vacuum (30 mmHg) and purged of nitrogen at 14° C. Then 149.9 g of a 75% by weight solution of t-amyl perpivalate initiator in isododecane was introduced. At a speed of 300 rpm, 21.6 g of hydroxyethylacrylate (HEA) and 1873 g of hexafluoropropylene (HFP) monomers were introduced in the reactor, followed by 16597 g of vinylidene fluoride (VDF). The reactor was gradually heated until a set-point temperature at 57° C. and the pressure was fixed at 110 bar. The pressure was kept constantly equal to 110 bars by feeding 13 kg of aqueous solution containing a 240.6 g of HEA during the polymerization. After this feeding, no more aqueous solution was introduced and the pressure started to decrease. Then, the polymerization was stopped by degassing the reactor until reaching atmospheric pressure. In general a conversion around 75% of monomers was obtained. The polymer so obtained was then recovered, washed with demineralised water and oven-dried at 65° C.

Example 2: Preparation of Terpolymer VDF-HFP-AA ((Polymer (FB))

In a 80 liters reactor equipped with an impeller running at a speed of 250 rpm were introduced in sequence 59004 g of demineralised water and 11.1 g of METHOCEL® K100 GR suspending agent. The reactor was purged with sequence of vacuum (30 mmHg) and purged of nitrogen at 20° C. Then 174.8 g of a 75% by weight solution of t-amyl perpivalate initiator in isododecane was introduced. At a speed of 300 rpm, 8.8 g of acrylic acid (AA) and 1874 g of hexafluoropropylene (HFP) monomers were introduced in the reactor, followed by 16672 g of vinylidene fluoride (VDF). The reactor was gradually heated until a set-point temperature at 56° C. and the pressure was fixed at 110 bar. The pressure was kept constantly equal to 110 bars by feeding 12.78 kg of aqueous solution containing a 178.5 g of AA during the polymerization. After this feeding, no more aqueous solution was introduced and the pressure started to decrease. Then, the polymerization was stopped by degassing the reactor until reaching atmospheric pressure. In general a conversion around 80% of monomers was obtained. The polymer so obtained was then recovered, washed with demineralised water and oven-dried at 65° C.

The composition and intrinsic viscosities of the polymers (A) and (B) prepared in Examples 1 and 2 reported in Table 1.

TABLE 1

| Polymer | NMR composition | | | | Intrinsic viscosity |
| | VDF mol % | HFP mol % | AA mol % | HEA mol % | DMF at 25° C. l/g |
| --- | --- | --- | --- | --- | --- |
| FA | 96.5 | 2.9 | | 0.7 | 0,08 |
| FB | 96.8 | 2.5 | 0.7 | | 0,095 |

The fraction of randomly distributed units (HA) in polymer (FA) and of (CA) in polymer (FB) is more than 40%.

Example 3: Blending of Polymer (FA) and Polymer (FB) 50/50 wt %, Extrusion and Pelletization In a first step, 50 weight percent of polymer FA was mixed in a high speed mixer Henschel (FML 40 Model) with 50 weight percent of polymer FB to obtain a powder mixture B1. Then, in a second step, the powder mixture B1 was introduced and pelletized in a twin screw co-rotating extruder (Leistritz LSM 30.34 GG-5R having a screw diameter D of 34 mm) equipped with a main feeder. The barrel was composed of six temperature controlled zones that permit to set the desired temperature profile (see table 2). The die was composed of two holes having each a diameter of 4 mm. The extruder rotation speed was 100 rpm. The two extrudates were cooled in a water tank, pull out and then dried with compressed air. At the end, the two extrudates were cut-off in order to obtain the pellets.

TABLE 2

| Zone | 1 | 2 | 3 | 4 | 5 | 6 |
| --- | --- | --- | --- | --- | --- | --- |
| Temperature Profile [° C.] | 170 | 170 | 175 | 175 | 175 | 175 |

Example 4: Blending of Polymer (FA) and Polymer (FB) 50/50 wt % with 10 ppm of $Sb_2O_3$, Extrusion and Pelletization In a first step, 49.995 weight percent of polymer FA was mixed with a high speed mixer Henschel (FML 40 Model) with 49.995 weight percent of polymer FB and 0.01 weight percent of Antimony(III) oxide ($Sb_2O_3$) provided by Sigma-Aldrich to obtain a powder mixture B2. Then, in a second step, the powder mixing B2 was introduced and pelletized in a twin screw co-rotating extruder (Leistritz LSM 30.34 GG-5R having a screw diameter D of 34 mm) equipped with a main feeder. There is six temperature controlled zones that permit to set the desired temperature profile (see table 3). The die was composed of two holes having each a diameter of 4 mm. The extruder rotation speed was 100 rpm. The two extrudates were cooled in a water tank, pull out and then dried with compressed air. At the end, the two extrudates were cut-off in order to obtain the pellets.

TABLE 3

| Zone | 1 | 2 | 3 | 4 | 5 | 6 |
|---|---|---|---|---|---|---|
| Temperature Profile [° C.] | 170 | 170 | 175 | 175 | 175 | 175 |

Example 5: Heat Treatment—Crosslinking

The polymers FA and FB and the blends B1 and B2 were put in Dynamic mechanical spectrometer Anton Paar MCR502 (Geometry: Parallel plates (25 mm); Mode: Dynamic time sweep test at two temperatures 190° C. and 230° C.). The apparent viscosity measured after 28.8 seconds and 7200 seconds is presented in the following Table 4.

TABLE 4

| | Apparent Viscosity (Pa*s) | | | |
|---|---|---|---|---|
| Polymer | 190° C. 28.8 s | 230° C. 28.8 s | 190° C. 7 200 s | 230° C. 7 200 s |
| FA | | 1052 | | 13214 |
| FB | | 3225 | | 2990 |
| Pellets of B1 | 5859 | | 23800 | |
| Pellets of B2 | 6321 | | 47671 | |

Example 6: Crosslinking Evaluation

With the pellets of blend B1 obtained in Example 3 and of blend B1 obtained in Example 4 two plaques each of 1.5 mm of thickness (10*10 cm) were prepared. One of each has been treated in an oven at 140° C. and 48 h. Then percentage of gel of the four plaques was determined as follows.

Dissolution in DMA of the pellet (0.25% w/vol) at 45° C., under stirring, until complete dissolution (about two hours). Then centrifugation at 20000 rpm for 60 minutes at room temperature using a Sorvall RC-6 Plus centrifuge (rotor model: F21S-8X50Y). Then weighing the dried residual to estimate the gel percentage.

The results are presented in the Table 5.

TABLE 5

| Plaques | Insoluble (w %) |
|---|---|
| B1 | <3 |
| B1 Treated at 140° C./48 h | 34 |
| B2 | <3 |
| B2 Treated at 140° C./48 h | 58 |

The results show that blend B1 and blend B2 are fully crosslinked, the percentage of insoluble being very high.

The invention claimed is:

1. A crosslinkable composition (C) comprising:
A) at least one fluoropolymer [polymer (FA)] comprising:
(i) recurring units derived from vinylidene fluoride (VDF) monomer;
(ii) recurring units derived from at least one hydroxyl group-containing vinyl monomer (HA),
wherein the total amount of recurring units (ii) in said polymer (FA) is of at most 10.0% by moles, with respect to the total moles of recurring units of polymer (FA); said polymer (FA) being characterized by a fraction of randomly distributed units (HA) of at least 40%; and
B) at least one a fluoropolymer [polymer (FB)], different from polymer (FA), comprising:
(i) recurring units derived from vinylidene fluoride (VDF) monomer;
(iii) recurring units derived from at least one carboxyl group-containing vinyl monomer (CA);
wherein the total amount of recurring units (iii) in said polymer (FB) is of at most 10.0% by moles, with respect to the total moles of recurring units of polymer (FB); said polymer (FB) being characterized by a fraction of randomly distributed units (CA) of at least 40%; and
further comprising at least one acidic crosslinking catalyst.

2. The composition (C) of claim 1 wherein the hydroxyl group-containing vinyl monomer (HA) is a compound of formula (I):

wherein:
$R_1$, $R_2$ and $R_3$, equal to or different from each other, are independently selected from a hydrogen atom, a halogen atom, and a $C_1$-$C_3$ hydrocarbon group and $R_{OH}$ is a $C_2$-$C_{10}$ hydrocarbon chain moiety comprising at least one hydroxyl group and possibly containing in the chain one or more oxygen atoms, carbonyl groups or carboxy groups.

3. The composition (C) of claim 2 wherein monomer (HA) is a compound of formula (Ia):

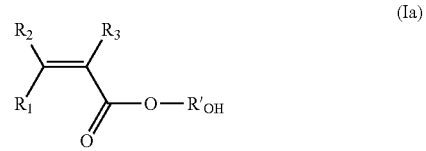

wherein:
$R_1$, $R_2$ and $R_3$, equal to or different from each other, are independently selected from a hydrogen atom and a $C_1$-$C_3$ hydrocarbon group and $R'_{OH}$ is a $C_1$-$C_5$ hydrocarbon moiety comprising at least one hydroxyl group.

4. The composition (C) of claim 3 wherein monomer (HA) of formula (Ia) is selected from the group consisting of hydroxyethyl (meth) acrylate (HEA), 2-hydroxypropyl acrylate (HPA), and mixtures thereof.

5. The composition (C) of claim 1 wherein the carboxyl group-containing vinyl monomer (CA) is a compound of formula (II):

wherein:
R$_1$, R$_2$ and R$_3$, equal to or different from each other, are independently selected from a hydrogen atom and a C$_1$-C$_3$ hydrocarbon group and R$_H$ is a C$_2$-C$_{10}$ hydrocarbon moiety comprising at least one carboxyl group.

6. The composition (C) of claim 1 wherein (CA) is a compound of formula (IIa):

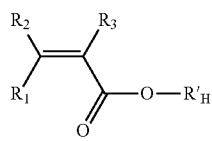

(IIa)

wherein
R$_1$, R$_2$ and R$_3$, equal to or different from each other, are independently selected from a hydrogen atom and a C$_1$-C$_3$ hydrocarbon group and R'$_H$ is a hydrogen or a C$_1$-C$_5$ hydrocarbon moiety comprising at least one carboxyl group.

7. The composition (C) of claim 6 wherein monomer (CA) is selected from the group consisting of acrylic acid (AA), (meth) acrylic acid and mixtures thereof.

8. The composition (C) according to claim 1 wherein polymer (FA) further comprises recurring units derived from one or more fluorinated comonomers (CF) different from VDF.

9. The composition (C) according to claim 1 wherein polymer (FB) further comprises recurring units derived from one or more fluorinated comonomers (CF) different from VDF.

10. The composition (C) according to claim 1 wherein:
polymer (FA) comprises:
at least 70% by moles of vinylidene fluoride (VDF),
from 0.1% to 3.0% by moles of at least one hydroxyl group-containing vinyl monomer (HA);
optionally from 0.5 to 3.0% by moles of recurring units derived from at least one fluorinated comonomer (CF), and
polymer (FB) comprises:
at least 70% by moles of vinylidene fluoride (VDF),
from 0.1% to 3.0% by moles of at least one carboxyl group-containing vinyl monomer (CA);
optionally from 0.5 to 3.0% by moles of recurring units derived from at least one fluorinated comonomer (CF).

11. The composition (C) of claim 1 wherein the acidic crosslinking catalyst is a Lewis acid selected from the group consisting of boron trifluoride, aluminum chloride, zinc chloride, stannous chloride, antimony trichloride, ferric chloride, boron trifluoridedimethyl ether complex, boron trifluoride-diethyl ether complex, boron trifluoride-dipropyl ether complex and antimony trioxide.

12. A process for preparing a crosslinked fluoropolymer (XLF) comprising the step of submitting a composition (C) according to claim 1 to a heat treatment at a temperature comprised between 130° C. and 250° C.

13. A shaped article comprising the crosslinked fluoropolymer (XLF) obtained according to the process of claim 12.

14. A method for making a shaped article comprising the crosslinked fluoropolymer (XLF), the method comprising:
A) processing a composition (C) according to claim 1 into a shaped article;
B) thermally treating the shaped article provided in step (a) at a temperature comprised between 130° C. and 250° C.

15. The composition (C) of claim 1 wherein monomer (HA) is selected from the group consisting of hydroxyethyl (meth) acrylate (HEA), 2-hydroxypropyl acrylate (HPA), hydroxyethylhexyl(meth)acrylate, and mixtures thereof.

* * * * *